D. L. SUMMEY.
METHOD OF AND MACHINE FOR EXTRUDING METAL.
APPLICATION FILED MAY 25, 1911.
1,011,876.
Patented Dec. 12, 1911.
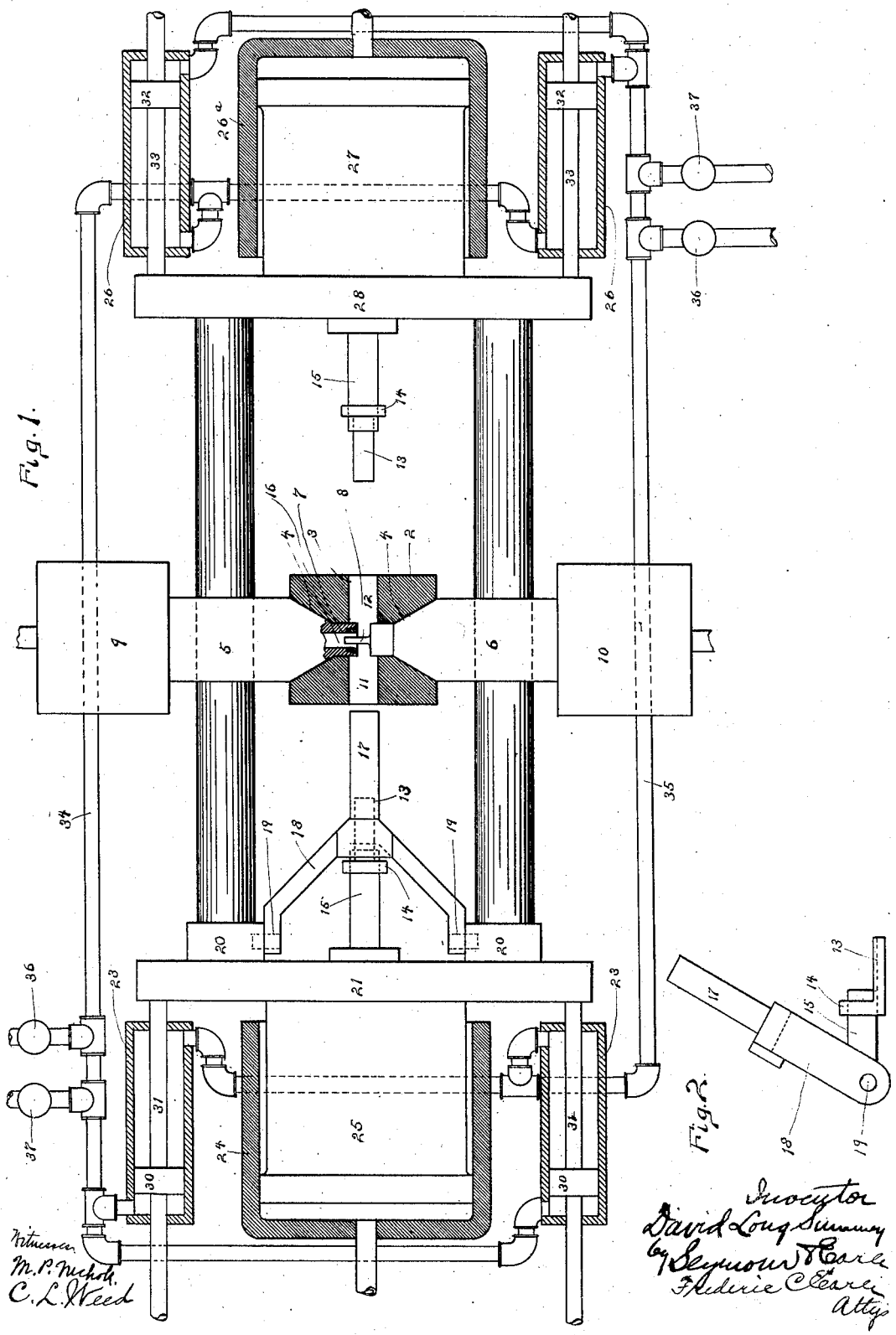

UNITED STATES PATENT OFFICE.

DAVID LONG SUMMEY, OF WATERBURY, CONNECTICUT, ASSIGNOR TO CHASE ROLLING MILL CO., OF WATERBURY, CONNECTICUT, A CORPORATION.

METHOD OF AND MACHINE FOR EXTRUDING METAL.

1,011,876.   Specification of Letters Patent.   Patented Dec. 12, 1911.

Application filed May 25, 1911. Serial No. 629,273.   REISSUED

*To all whom it may concern:*

Be it known that I, DAVID LONG SUMMEY, a citizen of the United States, residing at Waterbury, in the county of New Haven and State of Connecticut, have invented a new and useful Improvement in Methods of and Machines for Extruding Metal; and I do hereby declare the following, when taken in connection with the accompanying drawings and the letters of reference marked thereon, to be a full, clear, and exact description of the same, and which said drawings constitute part of this specification, and represent, in—
Figure 1 a view partly in plan and partly in horizontal section, and diagrammatic in its character, of one form which an extrusion machine constructed in accordance with my invention may assume. Fig. 2 a broken view in side elevation of the supplemental or stump-expelling ram and one of the two sliding billet-carriers.

My invention relates to an improved method of, and machine for, extruding metal tubes, rods and the like, the object being to produce extruded metal stock of superior quality and accuracy at a greatly reduced cost, and to dispense with piercing the billets either before or after their introduction into the container of the machine so as to permit the accurate and solid positioning of the tools employed for shaping the metal, whatever their character, prior to the application of any pressure to the billets.
With these ends in view my invention consists in the method and machine to be hereinafter described and pointed out in the claims.

In carrying out my invention as herein shown, I employ a cylindrical container 2 traversed by a central cylindrical billet-chamber 3 which is open at both ends and of any desired cross-section. The said container 2 is also formed with a transverse passage shaped like an hour glass, open at both ends and intersecting the said billet-receiving chamber 3 midway the length thereof and at a right angle thereto. This passage forms, in effect, a lateral opening through which the metal is extruded from the chamber 3, and provides two concentric centering chambers 4 for the reception, respectively, of the conical ends of the reciprocating holders 5 and 6 of the die 7 and mandrel 8, the said holders being in effect heavy pistons or plungers operated by hydraulic cylinders 9 and 10 of any approved construction and requiring no detailed description.

In practicing my improved method, the holders 5 and 6 are advanced until their conical forward ends are seated in the conical outer ends of the respective centering-chambers 4, whereby the die 7 and mandrel 8 are accurately located and solidly held in the positions which they will have during the extrusion of the metal which is attended by great pressures. Two billets 11 and 12 shown by broken lines in Fig. 1, and preferably heated, are now placed as nearly simultaneously as possible, upon sliding billet-carriers each consisting of a horizontal shelf 13 and a collar 14, and respectively mounted upon the ends of the main or metal-extruding rams 15 which are located on opposite sides of the said container 2 and arranged in line with each other and in line with the billet-receiving chamber 3 with which they are concentric. The billets are solid, and by the term "solid" I refer to their condition which is sufficiently rigid to retain their shape while being introduced into the chamber and not to the shape or form of the billet, which, if desired, may be perforated or hollow. The main rams 15 are now simultaneously advanced at the same speed toward the container 2. As soon as the ends of the shelves 13 of the billet-carriers strike the opposite faces of the container 2, the said carriers stop but the rams continue to move forward through them, whereby the billets are gradually pushed off the carriers and entered into the opposite ends of the billet-receiving chamber 3. During this time the two main rams 15 are operated under low pressures, but when the billets have been fully introduced into the opposite ends of the chamber 3, high pressures of water are simultaneously thrown on the said rams, whereby the billets are forced inward and caused to weld together and flow around the mandrel 8 into the die 7 and thence outward in the form of a concentric tube through a passage 16 in the holder 5 in which the die 7 is mounted. After the completion of the extrusion operation, the said main rams 15 are moved outward into their charging positions in readiness for the reception of fresh billets upon their billet-carriers and the holders 5 and 6 are moved outward into their clearance positions for the expulsion from the chamber 3 of the "stump" which is the term employed to describe the tag-end of metal which does not extrude.

For the expulsion of the stump I provide, as herein shown, a pivotal supplemental or stump-expelling ram 17 made as long as the chamber 3 and projecting from a yoke 18 the arms of which are secured by pivots 19 to blocks 20 fastened to the inner face of the main cross-head 21 employed to guide the left hand ram 15 as will be described later on. During the extrusion operation the said supplemental ram 17 is held in an elevated position as shown in Fig. 2, but preparatory to the expulsion of the stump it is let down into a horizontal position as shown in Fig. 1 after which the left hand ram 15 is advanced by itself with the effect of pushing the ram 17 through the chamber 3 from which it expels every vestige of unextruded metal. The left hand ram 15 is then retired and the supplemental ram 17 raised preparatory to the repetition of the extrusion process. After the supplemental ram 17 has been lifted into its elevated position, the billet-carriers are manually slid forward upon the main rams 15 into their projected or billet-receiving positions.

In order that the two main rams 15 may be advanced at exactly the same speed and that any tendency to depart from synchronism of speed may be immediately corrected, I employ two pairs of speed-controlling cylinders 23, 23, and 26, 26. The cylinders 23, 23, are located on opposite sides of the main cylinder 24 containing the main piston 25 carrying the cross-head 21 before mentioned, while the cylinders 26, 26, are located on opposite sides of the main cylinder 26ᵃ containing the main piston 27 carrying a cross-head 28 supporting the right hand ram 15. The two cylinders 23 carry pistons 30 mounted upon piston rods 31 the forward ends of which are connected with the opposite ends of the cross-head 21, which thus serves to couple together the pistons 30 and the main piston 25. Similarly the speed-controlling cylinders 26 are provided with pistons 32 mounted upon rods 33 the inner ends of which are connected with the opposite ends of the cross-head 28 which thus serves to couple together the pistons 32 with the main piston 27. In order that any tendency on the part of the two rams 15 to move at different speeds may be immediately corrected, the outer ends of the controlling cylinders 23 are connected by a pipe 34 with the inner ends of the cylinders 26, while the inner ends of the cylinders 26 are connected by a pipe 35 with the outer ends of the cylinders 23. The pipes 34 and 35 are normally kept full of water which acts as a solid connection between the two pairs of speed-controlling cylinders and their pistons. Now as the pistons 30 are coupled with the main piston 25 through the cross-head 21, and as the pistons 32 are coupled with the main piston 27 through the cross-head 28, the pistons 30 and 32 must advance at the same speed as the pistons 25 and 27, which they cannot do unless the water displaced by the inward movement of the pistons 30 is precisely equal to the amount of water displaced by the inward movement of the pistons 32, all of the speed-controlling cylinders and their pistons and rods being of the same size. Now if for any reason one of the rams 15 meets with less resistance than the other, the tendency will be for it to move faster than the other. This tendency, however, will be immediately checked and corrected for the reason that the ram 15 meeting with less resistance cannot move forward faster than the water in the speed-controlling cylinders connected with it can be transferred to the outer ends of the other speed-controlling cylinders, and this cannot take place until the other speed-controlling cylinders can be prepared to accommodate the excess of water by the forward movement of their pistons. In other words, the water in the pipes 34 and 35 acts, as above stated, in effect as a solid body to transfer energy from the main ram moving too rapidly to the main ram moving too slowly, whereby the ram moving too rapidly receives an excess of load, and is thus checked, while the other ram is accelerated in speed. In this way when one ram tends to gain in speed a load is immediately put upon it which synchronizes its speed with the other ram, and vice versa.

In order to keep the pipes 34 and 35 at all times filled with water, I provide them with water-supply check valves 36, of any approved construction, which automatically open to permit water to flow into the said pipes to make up for any loss by evaporation or leakage, these valves automatically closing to prevent any escape of water during the operation of the apparatus. The pipes 34 and 35 are also provided with relief check-valves 37 opening outwardly, but normally held closed by a predetermined external water pressure equivalent to a maximum water pressure above which it is designed that the pressure of water in the pipes 34 and 35 and the cylinders 23, 23 and 26, 26 shall not be carried. In case the pressure in the said cylinders and pipes passes this predetermined maximum pressure, the check valves 37 automatically open outwardly and afford the desired relief.

The reason why it is highly important that the main rams 15 shall advance at a uniform speed, is that it is desirable that the two billets in the billet-receiving chamber 3 shall be extruded at uniform speeds so as to produce the highest quality of extruded stock.

I particularly wish to point out that under my improved method, the forming tools, whatever their character may be, are accurately and solidly positioned with respect to the container prior to the introduction of the billets and before the pressures are applied thereto, and this without piercing the billets after their introduction into the container or casting them hollow as has heretofore been done.

Thus far I have referred only to the extrusion of metal, but my improved machine might also be used for the extrusion of other material, such as glass, some clays, such as fibrous asphaltic clay, compositions, etc.

I claim:—

1. A method of extruding metal, consisting in introducing billets into the open ends of a billet-receiving chamber formed in a container, then simultaneously subjecting the ends of the billets to inward pressure for the extrusion of the metal through metal-shaping tools located in the side walls of the container in a line at a right angle to the longitudinal axis of the said billet-receiving chamber, then expelling the unextruded metal from the said chamber, and then introducing new billets thereinto.

2. A method of extruding metal consisting in introducing a plurality of billets together into a billet-receiving chamber formed in the container, then subjecting the ends of the billets to inward pressure and extruding the stock through an opening in the side of the container.

3. A method of extruding metal, consisting in introducing a plurality of billets into a billet-receiving chamber in a container, then simultaneously subjecting the billets to inward pressure for the welding of the billets, and extruding the stock through an opening in the side of the container.

4. A method of extruding metal, consisting in introducing billets into the open ends of a billet-receiving chamber in a container, then simultaneously subjecting the ends of the billets to inward pressure, and extruding the metal through an opening in the side of the container, the speed at which the billets are moved toward each other during the extrusion operation being hydraulically controlled.

5. A method of extruding metal consisting in positioning metal-shaping tools in a billet-receiving chamber, then introducing a plurality of billets together into the open ends of said chamber, then subjecting the ends of the billets to inward pressure for forcing them upon the said previously positioned tools, and extruding the metal through an opening in the side of said chamber.

6. A method of extruding metal, consisting in positioning metal-shaping tools in a billet-receiving chamber in a container, then introducing billets into the opposite ends of the said chamber, then subjecting the billets to inward pressure for forcing them upon the said tools and extending them through an opening in the side of the container, then retiring the metal-shaping tools from the said chamber, and then expelling the unextruded metal from the chamber preparatory to repeating the process.

7. In a machine for extruding metal, the combination with a container, of a metal-extruding ram, and a supplemental ram for expelling the unextruded metal from the container.

8. In a machine for extruding metal, the combination with a container, of a metal-extruding ram, and a pivotally mounted stump-expelling ram for expelling the un- are being introduced into the container.

9. In a machine for extruding metal, the combination with a container having a billet-receiving chamber, of a metal-extruding ram, and a stump-expelling ram operated by the said metal-extruding ram and corresponding in length to the length of the said chamber.

10. In a machine for extruding metal, the combination with a container having a billet-receiving chamber open at both ends and having a lateral opening through which the metal is extruded, of two metal-extruding rams arranged in line with the opposite ends of the said chamber, means for operating the said rams, and a stump-expelling ram connected with one of the metal-extruding rams for operation thereby and equal in length to the length of the said chamber.

11. In a machine for extruding metal, the combination with a metal extruding ram, of a container, a billet carrier mounted thereupon for supporting the billets while they are being introduced into the container.

12. In a machine for extruding metal, the combination with a container, of a metal-extruding ram, and a sliding billet-carrier consisting of a shelf located beneath the ram, and a sleeve encircling the ram and sliding thereupon.

13. In a machine for extruding metal, the combination with a container having a billet-receiving chamber, of two metal-extruding rams arranged to enter the opposite ends of the said chamber which has a lateral opening through which the metal is extruded, and hydraulic speed-controlling cylinders connected with the said rams and with each other for synchronizing the speed at which the rams advance into the said chamber.

14. In a machine for extruding metal, the combination with a container having a billet-receiving chamber open at both ends, of two metal-extruding rams arranged to enter the opposite ends of the said chamber, two main cylinders, pistons therefor, a pair of speed-controlling cylinders for each of the said main cylinders, and pipes connecting the inner ends of one pair of speed-controlling cylinders with the outer ends of the other pair of speed-controlling cylinders and vice versa, for controlling the speed at which the said rams are advanced into the said chamber.

15. In a machine for extruding metal, the combination with a container having a billet-receiving chamber open at both ends, of rams arranged to enter the opposite ends of the said chamber, a main cylinder and a piston for each ram, a cross-head carried by each piston, a pair of speed-controlling cylinders for each ram, the piston rods of the speed-controlling cylinders being connected with the respective cross-heads, and pipes connecting the inner ends of one pair of the speed-controlling cylinders with the outer ends of the other pair of the speed-controlling cylinders, and vice versa.

16. In a machine for extruding metal, the combination with a container having a billet-receiving chamber open at both ends, of rams arranged to enter the opposite ends of the said cylinders, speed-controlling cylinders respectively connected with the said rams and with each other, and valves for supplying water to the speed-controlling cylinders and safe-guarding the same when the pressure passes above a predetermined maximum.

17. In a machine for extruding metal, the combination with a container having a billet-receiving chamber open at both ends, of rams arranged to enter the opposite ends of the said chamber, a pair of speed-controlling cylinders having their piston-rods projecting through their outer ends for the equalization of volumes on the opposite sides of their pistons, pipes connecting the outer ends of one pair of cylinders with the inner ends of the other pair of cylinders, and vice versa, and supply and relief valves located in the said pipes.

In testimony whereof, I have signed this specification in the presence of two subscribing witnesses.

DAVID LONG SUMMEY.

Witnesses:
FRANK B. NOBLE,
F. S. CHASE.

---

Copies of this patent may be obtained for five cents each, by addressing the "Commissioner of Patents, Washington, D. C."